United States Patent
Hsu et al.

(10) Patent No.: US 9,739,256 B1
(45) Date of Patent: Aug. 22, 2017

(54) DRIVING STRUCTURE FOR POWER GENERATOR ALONG COASTAL LAND USING KINETIC ENERGY OF WAVE

(71) Applicants: Chi-Chin Hsu, New Taipei (TW); Kuo-Chou Lee, Keelung (TW); Tsan-Chang Huang, Taipei (TW)

(72) Inventors: Chi-Chin Hsu, New Taipei (TW); Kuo-Chou Lee, Keelung (TW); Tsan-Chang Huang, Taipei (TW)

( * ) Notice: Subject to any disclaimer, the term of this patent is extended or adjusted under 35 U.S.C. 154(b) by 0 days.

(21) Appl. No.: 15/099,079

(22) Filed: Apr. 14, 2016

(51) Int. Cl.
  *F03B 13/18* (2006.01)
  *H02K 7/18* (2006.01)

(52) U.S. Cl.
  CPC ....... *F03B 13/1815* (2013.01); *H02K 7/1853* (2013.01)

(58) Field of Classification Search
  CPC .......................... F03B 13/1815; H02K 7/1853
  USPC ........................................ 290/42, 53; 60/398
  See application file for complete search history.

(56) References Cited

U.S. PATENT DOCUMENTS

| | | | | |
|---|---|---|---|---|
| 5,405,250 A * | 4/1995 | Vowles | ............... | F03B 13/1815 417/331 |
| 5,921,082 A * | 7/1999 | Berling | ............... | F03B 13/1815 290/42 |
| 6,109,029 A * | 8/2000 | Vowles | .................. | B01D 61/10 270/42 |
| 8,925,312 B2 * | 1/2015 | Rosales Ureta | .... | F03B 13/1815 290/42 |
| 8,987,928 B2 * | 3/2015 | Jean | ........................ | F03B 11/00 290/42 |
| 2002/0195823 A1 * | 12/2002 | Aguirre | ................. | F03B 13/184 290/53 |
| 2006/0232074 A1 * | 10/2006 | Chiasson | ............ | F03B 13/1815 290/53 |
| 2008/0110168 A1 * | 5/2008 | Gracia Lopez | ..... | F03B 13/1815 60/497 |
| 2008/0272600 A1 * | 11/2008 | Olson | ................. | F03B 13/1815 290/53 |
| 2008/0295510 A1 * | 12/2008 | Vukovic | ............. | F03B 13/1815 60/505 |
| 2012/0104761 A1 * | 5/2012 | Vamvas | .................. | F03B 13/16 290/53 |

(Continued)

FOREIGN PATENT DOCUMENTS

TW M516801 U 2/2016
TW M293346 U 7/2016

*Primary Examiner* — Viet Nguyen
(74) *Attorney, Agent, or Firm* — Muncy, Geissler, Olds & Lowe, P.C.

(57) ABSTRACT

The present invention discloses a driving structure for a power generator along a coastal land using kinetic energy of wave. The power generator is operated via upward and downward swing of a toggle lever. The structure is provided with a wave-guiding channel for constraining flow direction of waves. The channel is provided with two side walls, an end portion connecting the side walls, and an intake opening toward the ocean, so as to form a gully. At the top of side wall, an extending portion is provided near the end portion. The extending portion is provided with a pivot. The structure is further provided with a floating body in the gully near the end portion. The floating body is provided at one end thereof with a coupling portion connected to the pivot, and provided at the other end thereof with an abutting portion abutted against the toggle level.

13 Claims, 5 Drawing Sheets

(56) References Cited

U.S. PATENT DOCUMENTS

| | | | |
|---|---|---|---|
| 2013/0140821 A1* | 6/2013 | Sapir | F03B 13/16 290/50 |
| 2014/0217734 A1* | 8/2014 | Peng | F03B 13/1815 290/53 |
| 2014/0217736 A1* | 8/2014 | Peng | F03B 13/1815 290/53 |
| 2014/0239642 A1* | 8/2014 | Peng | F03B 13/1815 290/53 |
| 2016/0032886 A1* | 2/2016 | Yang | F03B 13/1815 290/53 |
| 2016/0138556 A1* | 5/2016 | Lee | F03B 13/1855 290/42 |

* cited by examiner

DRIVING STRUCTURE FOR POWER GENERATOR ALONG COASTAL LAND USING KINETIC ENERGY OF WAVE

FIELD OF THE INVENTION

The present invention is related to a driving structure for power generator, particularly to a driving structure for driving power generator to generate electricity by the use of ocean waves as kinetic energy.

BACKGROUND OF THE INVENTION

Firstly, the power generator of the present invention belongs to existing technology, such as Taiwan patent publication No. M516801, entitled "Improved structure of magnetic controlled power generator". The power generator of the existing technology comprises a fixed shaft penetrating through a bush of a flywheel device, in such a way that the power generator, a magnetic controlled loading device and the flywheel device are fitted together, so as to form the power generator of the existing technology. In this case, a one-way bearing is provided between the bush of the flywheel device and a transmission wheel, the one-way bearing enabling the transmission wheel to turn the flywheel device unidirectionally; that is to say, impairment of mechanism caused by reversely turned flywheel device is avoided when the transmission wheel is rotated reversely in the backward operation. The one-way bearing of the existing technology, however, may be also a ratchet wheel. This power generator will not be no longer described with respect to its construction and function herein, because it is not the object to be claimed for protection in the present invention.

In addition, the driving structure of the present invention is mainly used for driving the power generator for electricity generation. Therefore, the existing technology related to the driving structure of the present invention may be found in the Taiwan patent publication No. M293346, filed by this inventor formerly. This existing technology discloses a power generating structure of wave-collecting gully with swing water gate, which is provided with a coastal recessed wave-collecting gully. The wave-collecting gully includes at least one floating swing water gate with back-end buffer region. Severe waves are generated along the coast. Hence, the key point in this design is the wave-collecting gully with sufficient depth, used as the connection with the ocean, capable of guiding the waves into the wave-collecting gully directly before the force of waves is released. Thus, the most part of kinetic energy of wave may be released to be applied to the swing water gate, such that the swing water gate is pushed to incline inwardly. In this way, the force of swing of the swing water gate is then converted into a force, turning a flywheel unidirectionally and further driving a power generator, via a pivot of the gate. It could be clearly seen that, however, from the existing technology, there are truly serious drawbacks in the structure as follows: firstly, frequent damage to swing water gate or pivot of gate because the swing water gate and its pivot of the existing technology should be soaked in seawater and invaded by severe kinetic energy of wave over a long period of time; and secondly, harder maintenance and installation for the damaged swing water gate and its pivot of the existing technology.

SUMMARY OF THE INVENTION

The primary object of the present invention is: 1. more simple and rigid structure; 2. easy installation with lower cost; 3. convenient maintenance and easy management; 4. higher durability and prolonged service life; 5. numerous installations along the coastal land for driving power generators simultaneously for the enhancement of the best efficiency of conversion of kinetic energy of wave into electrical energy with higher economic value.

In accordance with the aforementioned object, the present invention discloses a driving structure for power generator along coastal land using kinetic energy of wave. The driving structure using kinetic energy of wave is used for driving the power generator provided along the coastal land. The power generator is then operated via upward and downward swing of a toggle lever to generate electricity. In this case, the driving structure using kinetic energy of wave is provided with a wave-guiding channel for constraining the flow direction of waves. The wave-guiding channel is provided with two side walls, an end portion connecting the two side walls, and an intake facing and opening toward the ocean, so as to form a gully eventually closed by the end portion, in which, at the top of each of the two side walls, an extending portion extending upward is provided, respectively, near the end portion. The extending portion is pivotally provided with a pivot. Further, the driving structure using kinetic energy of wave is further provided with a floating body located in the gully and close to the end portion. The floating body is extendingly provided at one end thereof with a coupling portion pivotally connected to the pivot, and provided at the other end thereof with an abutting portion abutted against the toggle level normally.

Further, in one embodiment, the floating body is provided inside thereof with a hollow portion.

Further, in one embodiment, the gully is provided at the bottom thereof with a bottom portion with drainage gradient ranging from $1/100$ to $3/100$.

Further, in one embodiment, the intake is formed by tapering the spacing, between the two side walls, from the outside of the intake toward the interior of the intake.

Further, in one embodiment, a ratchet wheel is provided between the toggle lever and the power generator.

Further, in one embodiment, the power generator is provided outside thereof with a cover body. A stand is provided under the cover body, and a chassis is fixedly provided on the coastal land under the stand.

It is known from the aforementioned technical solution of the present invention that, in comparison with the existing technology, substantial benefits are provided as follows. Firstly, the wave-guiding channel is provided along the coastal land and recessed into land in the present invention, such that irregular waves may be converted into usable kinetic energy effectively when the waves are guided into the gully by the wave-guiding channel facing toward the ocean. Secondly, only forward and backward waves are allowed, because the waves within the gully are constrained by the gully. Thus, the floating body is not pressed by side turbulent flow without the problem of consumption of kinetic energy due to lateral sway. Moreover, the object of swiftly floating the floating body is also achieved, due to the fact that there is nowhere for the collapse of the waves eventually as well as the water level is tiered and then risen swiftly because of the constraint resulted from the end portion of the gully. In addition, thirdly, the problem of contacting with seawater does not occur on the pivot, because the floating body is extended to pivotally connect with the pivot, which is provided on the top of the two side walls of the gully to be rigid and far away from the highest water level of the waves. Moreover, the floating body and pivot is neither liable to be corroded by seawater, nor liable to be damaged by severe upward and downward movement of water level of the waves, with both easier construction and maintenance, because connections of gears or bolts are neither presented in the floating body nor in the pivot. Furthermore, fourthly, the floating body is extendingly provided at the other end thereof with the abutting portion, which is rigid as well as capable of pushing and then driving the power generator to generate electricity. The abutting portion is also not liable to damage caused by severe upward and downward movement of water level of the waves, with easier construction and maintenance, because connections of gears or bolts are similarly not presented in the abutting portion.

DETAILED DESCRIPTION OF THE PREFERRED EMBODIMENTS

Figure 1:
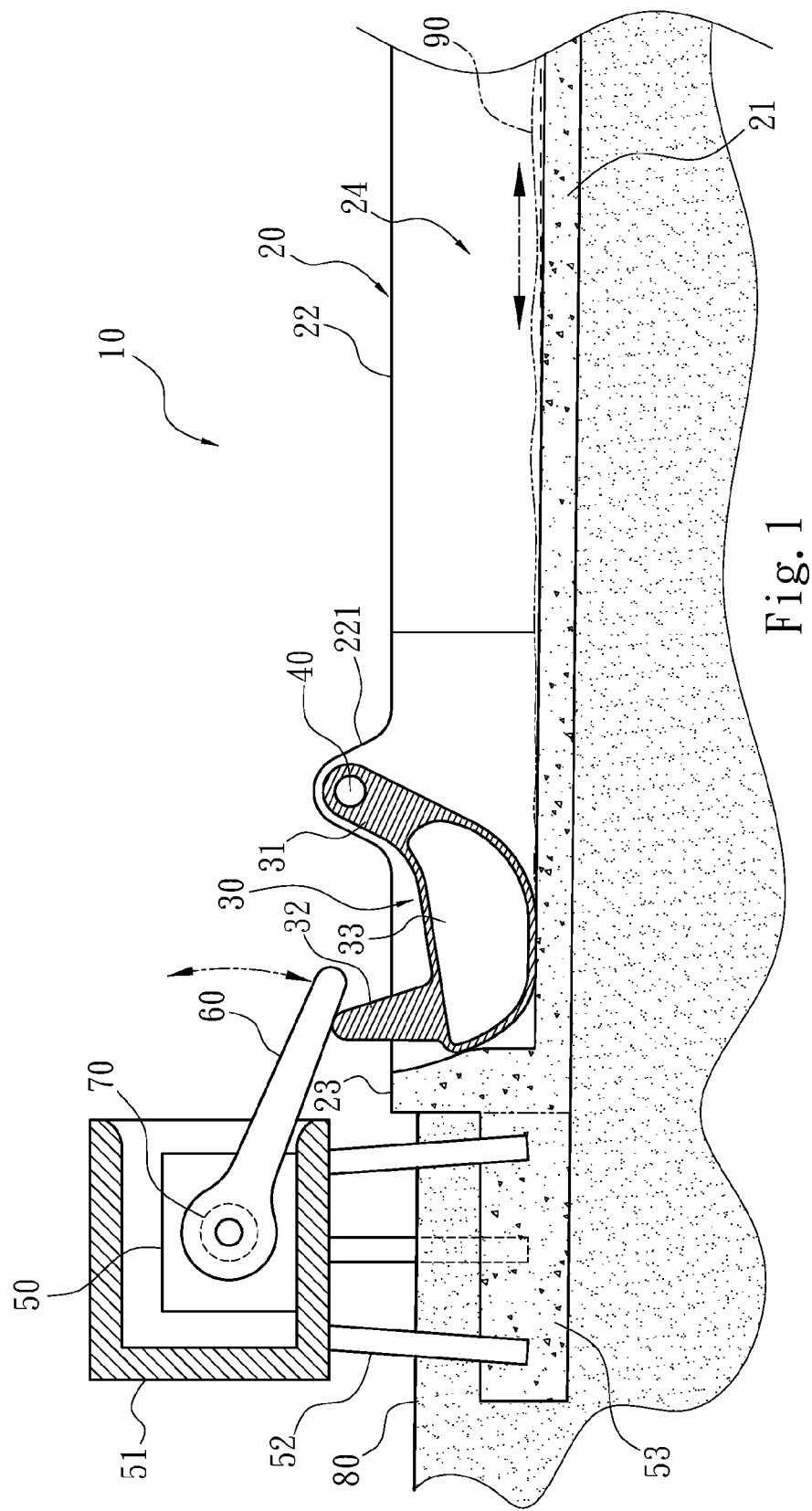
FIG. 1 is a partial side cross-sectional view according to a first preferred embodiment of the present invention.
Figure 2:
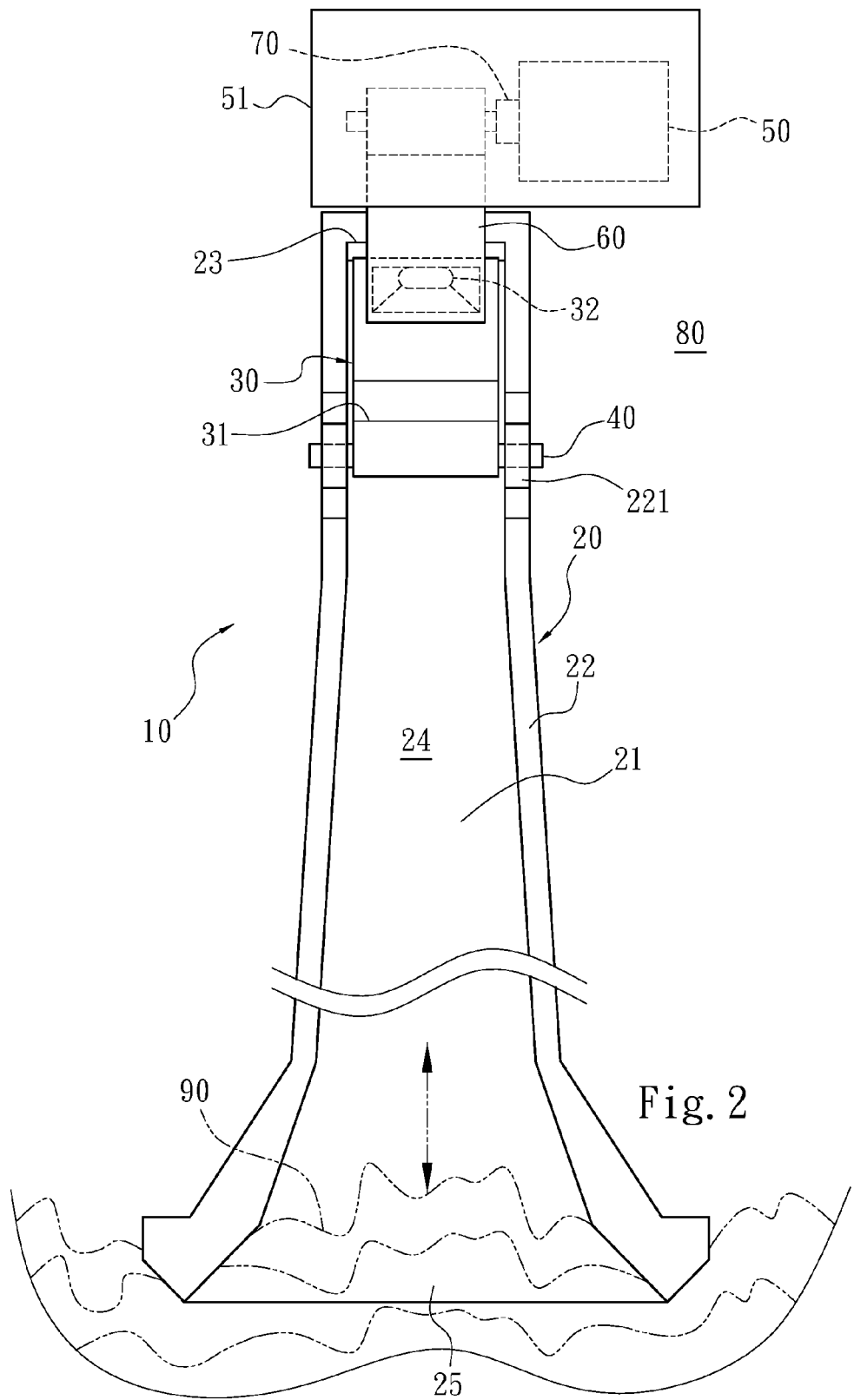
FIG. 2 is a top plan view according to the first preferred embodiment of the present invention.

The preferred embodiments and technical contents regarding the present invention will be described along with drawings as follows. Firstly, referring to FIG. 1 and FIG. 2 together, there are shown partial side cross-sectional view and top plan view according to a first preferred embodiment of the present invention. As clearly seen from the figures, the present invention proposes a driving structure for a power generator along a coastal land using kinetic energy of wave. The driving structure using kinetic energy of wave 10 is used for driving the power generator 50 provided along the coastal land 80. The power generator 50 is then operated via the upward and downward swing of a toggle lever 60 to generate electricity. In this case, the driving structure using kinetic energy of wave 10 is provided with a wave-guiding channel 20 for constraining the flow direction of waves 90. The wave-guiding channel 20 is provided with two side walls 22, an end portion 23 connecting the two side walls 22, and an intake 25 facing and opening toward the ocean, so as to form a gully 24 eventually closed by the end portion 23. At the top of each of the two side walls 22, an extending portion 221 extending upward is provided, respectively, near the end portion 23. The extending portion 221 is pivotally provided with a pivot 40. Further, the driving structure using kinetic energy of wave 10 is further provided with a floating body 30 located in the gully 24 and close to the end portion 23. The floating body 30 is extendingly provided at one end thereof with a coupling portion 31 pivotally connected to the pivot 40, and provided at the other end thereof with an abutting portion 32 abutted against the toggle lever 60 normally. In this case, the floating body 30 is provided inside thereof with a hollow portion 33, so as to facilitate the enhancement of buoyance of the floating body 30. Among others, the gully 24 is provided at the bottom thereof with a bottom portion 21 with drainage gradient ranging from 1/100 to 3/100, so as to facilitate smooth discharge of waves 90 in the undertow from the gully 24. Among others, however, the intake 25 is formed by tapering the spacing, between the two side walls 22, from the outside of the intake 25 toward the interior of the intake 25, so as to facilitate the gully 24 to receive a larger number of waves 90 initially, in such a way that more kinetic energy is generated and greater difference in water levels is achieved. In addition, in regard to the power generator 50, it is generally to provide a cover body 51 outside of the power generator 50, and install a stand 52 under the cover body 51. Thus, it is possible to ensure that the power generator 50 is not soaked in or corroded by seawater. Certainly, it is also possible to provide a chassis 53, fixedly provided on the coastal land 80, under the stand 52, such that the power generator 50 may be provided more stably. Finally, the driving structure using kinetic energy of wave 10 of the present invention is used for driving the power generator 50, such that a ratchet wheel 70 or one-way bearing may be provided between the toggle lever 60 and the power generator 50 for driving the power generator 50 unidirectionally. Namely, damage to the mechanism due to reversely driven the power generator 50, when the toggle lever 60 is turned downward under the self-gravity to operate reversely, may be avoided.

Figure 3:
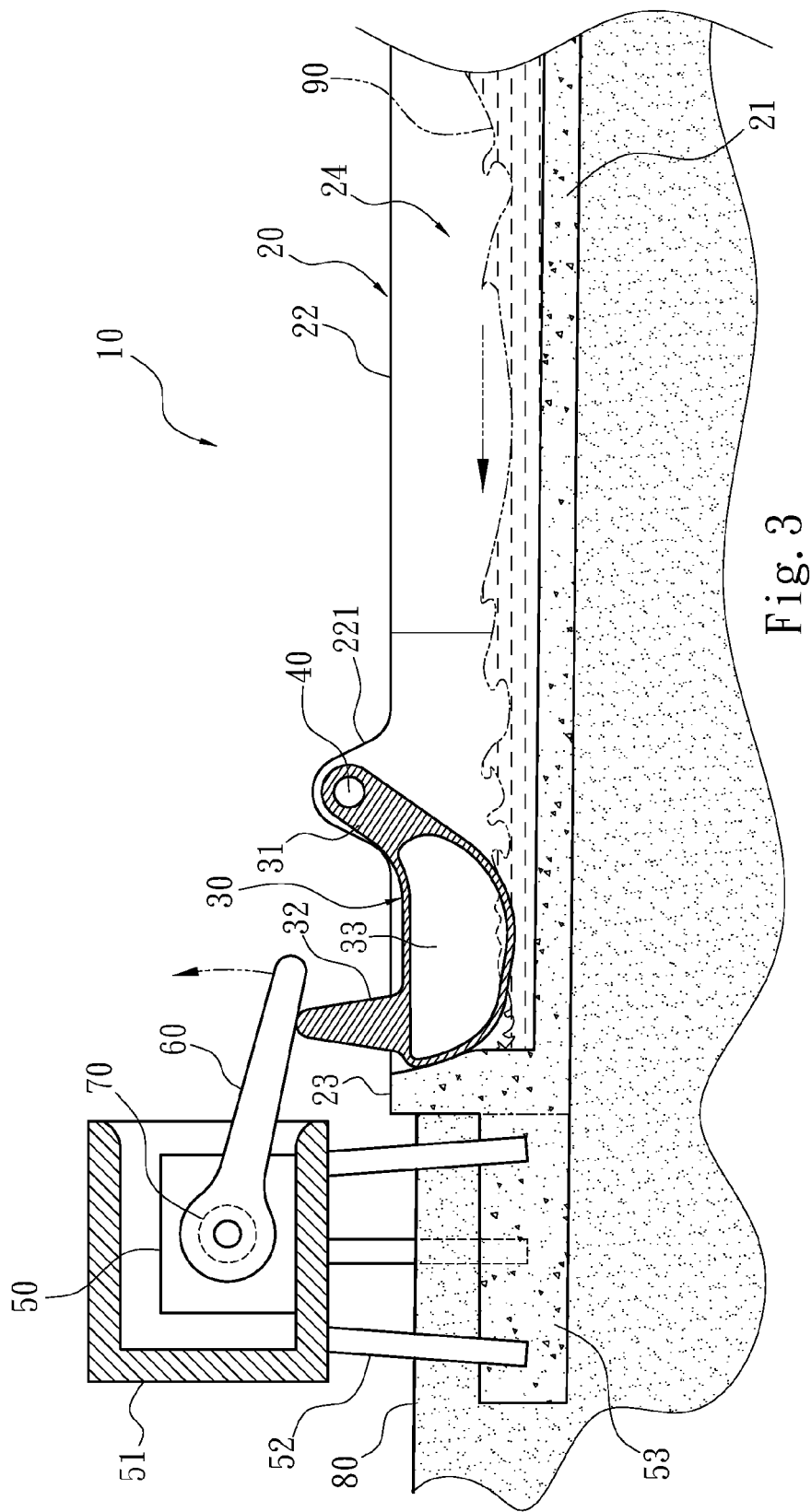
FIG. 3 is a schematic diagram for continuous operations according to FIG. 1 of the present invention.
Figure 4:
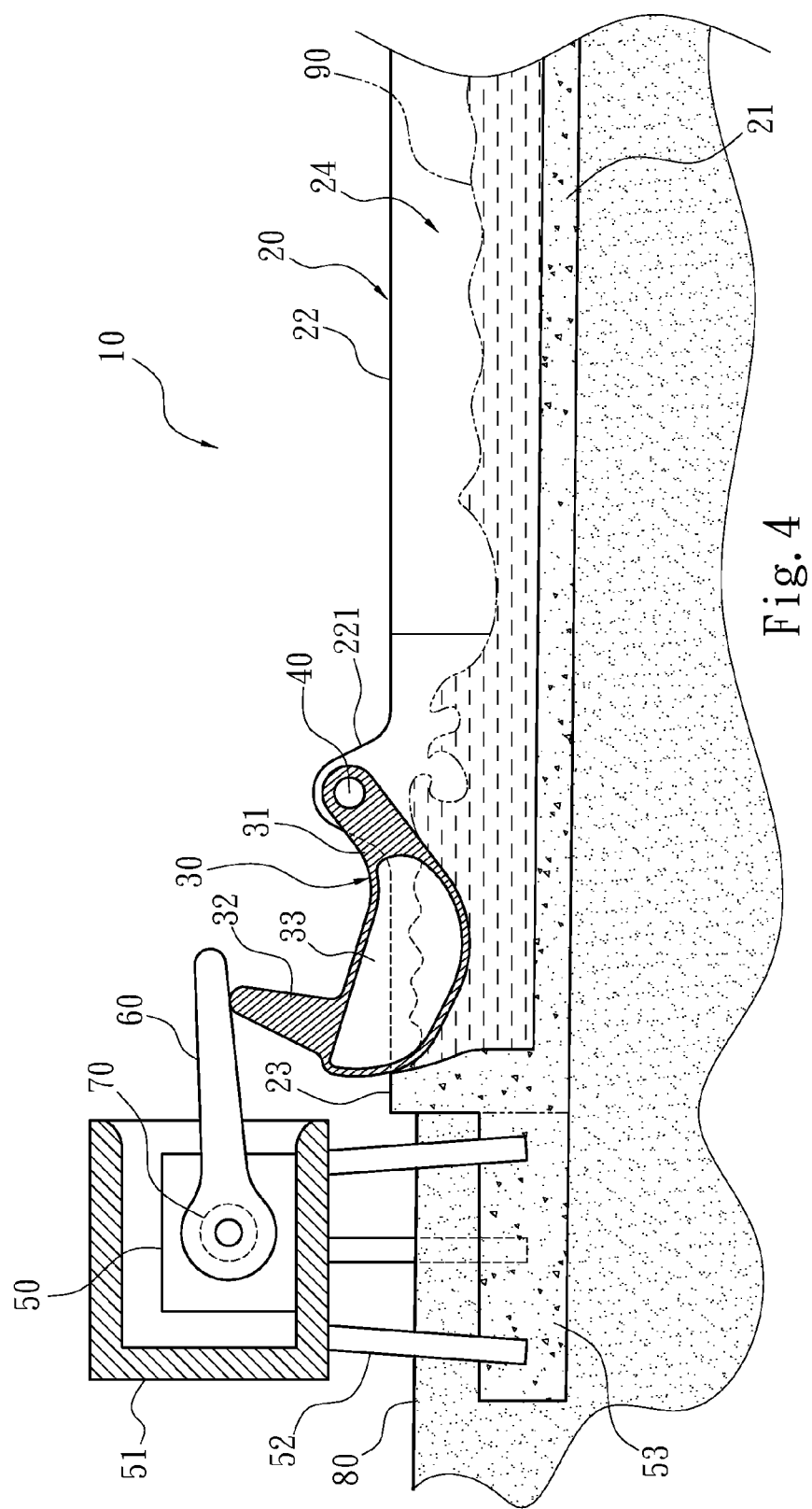
FIG. 4 is a schematic diagram for continuous operations according to FIG. 3 of the present invention.

Again, referring to FIG. 1, FIG. 3 and FIG. 4 together, there are shown a partial side cross-sectional view and a schematic diagram for continuous operations according to the first preferred embodiment of the present invention. Firstly, as clearly seen from FIG. 1, the floating body 30 is located at the downmost location under the self-gravity, because the water level resulted from the waves 90 is not presented beneath the floating body 30 yet when the waves 90 are started to enter into the wave-guiding channel 20. Moreover, the toggle lever 60 is then turned downward under the self-gravity, and the toggle lever 60 is abutted against and supported by the abutting portion 32. When a large number of waves 90 are started to enter into the gully 24 of the wave-guiding channel 20, the waves 90 may be transmitted to the floating body 30 in a direction parallel to the gully 24 linearly, and converted into kinetic energy of upward motion of the floating body 30 effectively by the gully 24, as illustrated in FIG. 3. When the waves 90 reach the end portion 23, the advancing power of the waves 90 is limited by the end portion 23. Hence, there is nowhere for the collapse of the waves 90, which results in swiftly tiered and then risen level of water. At this time, kinetic energy of faster upward motion of the floating body 30 may be then generated, such that the toggle lever 60 may be pushed upward by the abutting portion 32 rapidly. Finally, when kinetic energy of forward motion of the waves 90 is exhausted completely, the waves 90 are retreated out of the gully 24 very fast, while the water level beneath the floating body 30 is also dropped very fast. In the meantime, the floating body 30 together with the toggle lever 60 are both dropped under the self-gravity back to the state illustrated in FIG. 1. Therefore, the object of electricity generation may be achieved, due to the fact that the toggle lever 60 may be pushed by the abutting portion 32 for driving the power generator 50, on the basis of difference in undulating level of water, converted from kinetic energy of the waves 90, by the use of the driving structure using kinetic energy of wave 10 of the present invention. Similarly, in the case that the ratchet wheel 70 or one-way bearing between the toggle lever 60 and the power generator 50 is inversely provided, the object of electricity generation by virtue of driving the power generator 50 to operate may be also achieved by means of hooking and pulling the toggle lever 60 by the abutting portion 32.

Figure 5:
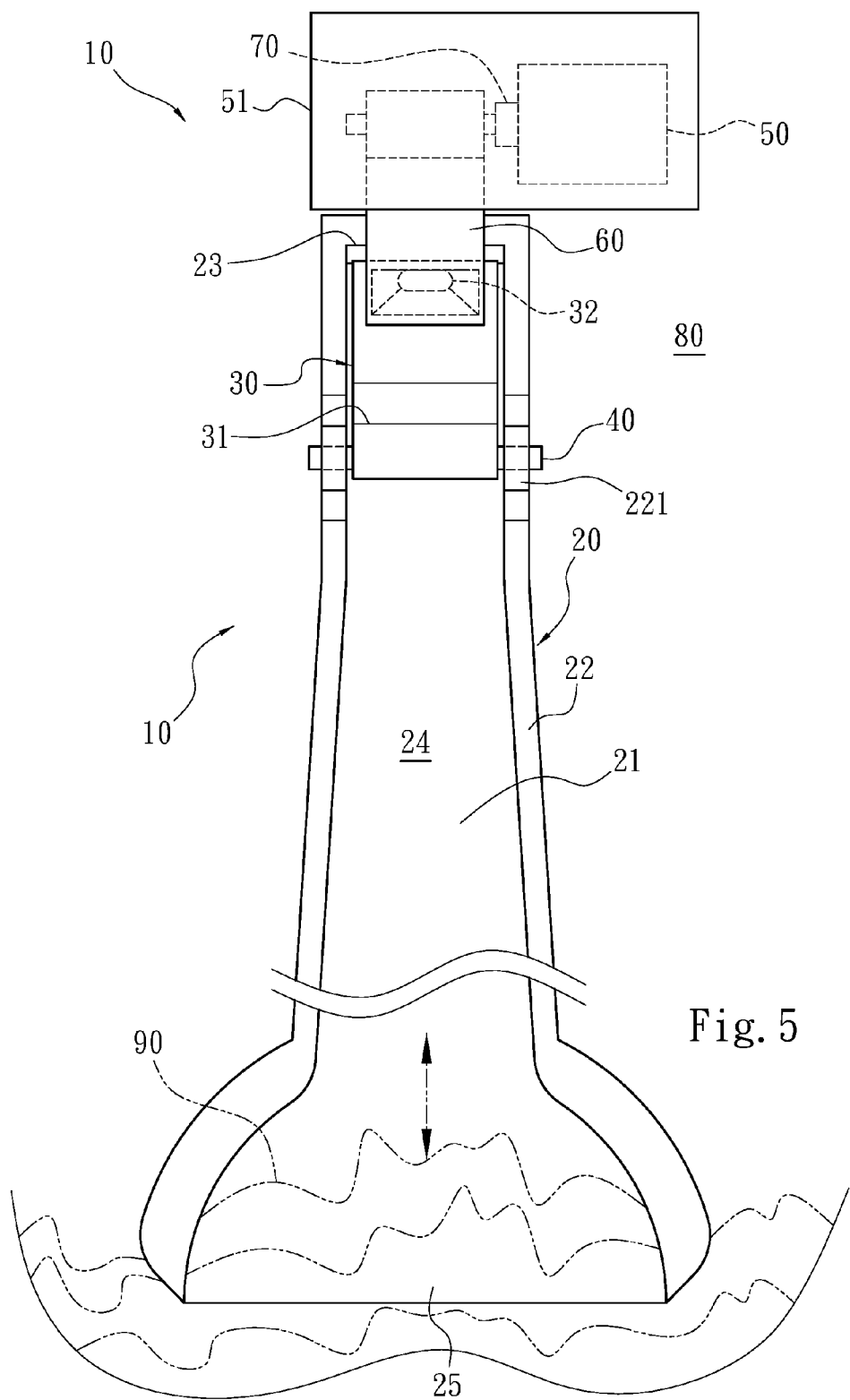
FIG. 5 is a top plan view according to a second preferred embodiment of the present invention.

Additionally, referring to FIG. 5, there is shown a top plane view according to a second preferred embodiment of the present invention. As clearly seen from the figures, the difference in the features of the second preferred embodiment in comparison with those of the first preferred embodiment is that the intake 25 of the second preferred embodiment is tapered, with reference to the spacing between the two side walls 22, in the shape of arc from the outside of the intake 25 toward the interior of the intake 25, so as to facilitate the reception of a larger number of waves 90 into the gully 24 initially. Then, much smoothness and more kinetic energy are produced. Moreover, greater difference in water level is achieved.

As known from the above, it is clear from the technical solution of the present invention that the wave-guiding channel 20 is provided along the coastal land 80 and recessed into land in the present invention. Thus, the irregular waves 90 may be converted into usable kinetic energy effectively when the waves 90 are guided into the gully 24 by the wave-guiding channel 20 facing toward the ocean. Moreover, only forward and backward waves 90 are allowed, because the waves 90 are constrained by the gully 24. Thus, the floating body 30 is not pressed by side turbulent flow without the problem of consumption of kinetic energy due to lateral sway. Moreover, the object of swiftly floating the floating body 30 is also achieved, due to the fact that there is nowhere for the collapse of the waves eventually as well as the water level is tiered and then risen swiftly because of the constraint resulted from the end portion 23 of the gully 24. In addition, the problem of contacting with seawater does not occur on the pivot 40, because the floating body 30 is extended to pivotally connect with the pivot 40, which is provided on the top of the two side walls 22 of the gully 24 to be rigid and far away from the highest water level of the waves. Moreover, the floating body 30 and pivot 40 are neither liable to be corroded by seawater, nor liable to be damaged by severe upward and downward movement of water level of the waves 90, with both easier construction and maintenance, because connections of gears or bolts are neither presented in the floating body 30 nor in the pivot 40. Furthermore, the floating body 30 is extendingly provided at the other end thereof with the abutting portion 32, which is rigid as well as capable of pushing and then driving the power generator 50 to generate electricity. The abutting portion 32 is also not liable to drag and the resulting damage caused by severe upward and downward movement of water level of the waves 90 or slight deviation of the floating body 30, with easier construction and maintenance, because connections of gears or bolts are similarly not presented in the abutting portion 32. A fixed direction of the waves, with which the floating body 30 is contacted, may be assured, because the floating body is provided, in the wave-guiding channel 20, near the end portion 23. Moreover, the structure of the power generator 50 is also not connected with the floating body 30 by means of gears or bolts. Thus, it is truly possible to increase the volume of the floating body 30 (or the occupied surface area of land in the region of the floating body 30) in the present invention, in such a way that greater buoyant force is exerted on the floating body 30 for obtaining greater efficiency of kinetic energy conversion, and then achieving greater economic effectiveness of the power generator 50.

What is claimed is:

1. A driving structure for a power generator along a coastal land using kinetic energy of wave, said driving structure using kinetic energy of wave being used for driving said power generator provided along said coastal land, said driving structure using kinetic energy of wave comprising: a wave-guiding channel for constraining the flow direction of waves, said wave-guiding channel being provided with two side walls, an end portion connecting said two side walls, and an intake facing and opening toward the ocean, so as to form a gully eventually closed by said end portion, wherein, at the top of each of said two side walls, an extending portion extending upward is provided, respectively, near said end portion, said extending portion being pivotally provided with a pivot; and wherein said driving structure using kinetic energy of wave is further provided with a floating body located in said gully and close to said end portion, said floating body being extendingly provided at one end thereof with a coupling portion pivotally connected to said pivot, and provided at the other end thereof with an abutting portion abutted against a toggle lever, said power generator being then operated via upward and downward swing of said toggle lever to generate electricity.

2. The driving structure for the power generator along the coastal land using kinetic energy of wave according to claim 1, wherein said floating body is provided inside thereof with a hollow portion.

3. The driving structure for the power generator along the coastal land using kinetic energy of wave according to claim 2, wherein said gully is provided at the bottom thereof with a bottom portion with drainage gradient ranging from $1/100$ to $3/100$.

4. The driving structure for the power generator along the coastal land using kinetic energy of wave according to claim 3, wherein said intake is formed by tapering the spacing, between said two side walls, from the outside of said intake toward the interior of said intake.

5. The driving structure for the power generator along the coastal land using kinetic energy of wave according to claim 2, wherein said intake is formed by tapering the spacing, between said two side walls, from the outside of said intake toward the interior of said intake.

6. The driving structure for the power generator along the coastal land using kinetic energy of wave according to claim 2, wherein a ratchet wheel is provided between said toggle lever and said power generator.

7. The driving structure for the power generator along the coastal land using kinetic energy of wave according to claim 2, wherein said power generator is provided outside thereof with a cover body, a stand being provided under said cover body, a chassis being fixedly provided on said coastal land under said stand.

8. The driving structure for the power generator along the coastal land using kinetic energy of wave according to claim 1, wherein said gully is provided at the bottom thereof with a bottom portion with drainage gradient ranging from $1/100$ to $3/100$.

9. The driving structure for the power generator along the coastal land using kinetic energy of wave according to claim 8, wherein said intake is formed by tapering the spacing, between said two side walls, from the outside of said intake toward the interior of said intake.

10. The driving structure for the power generator along the coastal land using kinetic energy of wave according to claim 8, wherein a ratchet wheel is provided between said toggle lever and said power generator.

11. The driving structure for the power generator along the coastal land using kinetic energy of wave according to claim 1, wherein said intake is formed by tapering the spacing, between said two side walls, from the outside of said intake toward the interior of said intake.

12. The driving structure for the power generator along the coastal land using kinetic energy of wave according to claim 1, wherein a ratchet wheel is provided between said toggle lever and said power generator.

13. The driving structure for the power generator along the coastal land using kinetic energy of wave according to claim 1, wherein said power generator is provided outside thereof with a cover body, a stand being provided under said cover body, a chassis being fixedly provided on said coastal land under said stand.

* * * * *